United States Patent Office 2,804,017
Patented Aug. 27, 1957

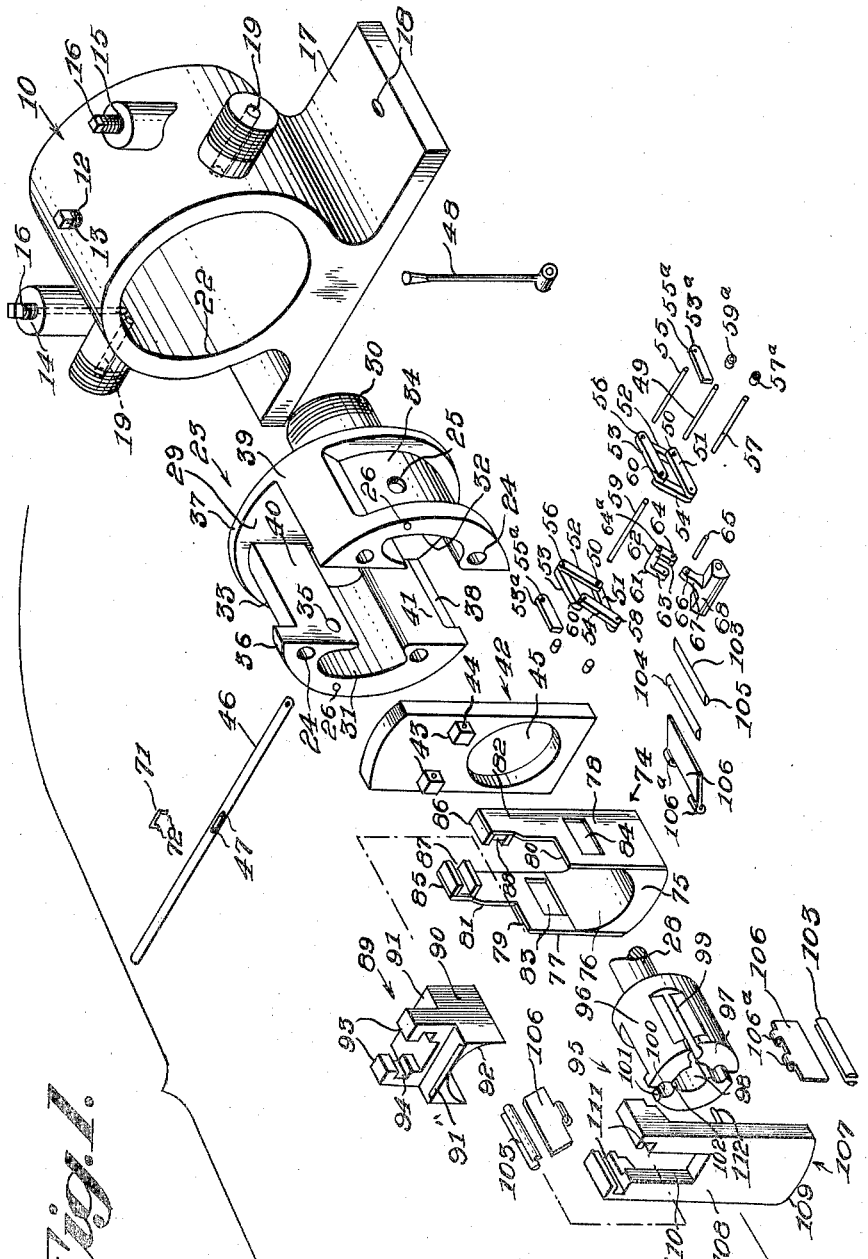

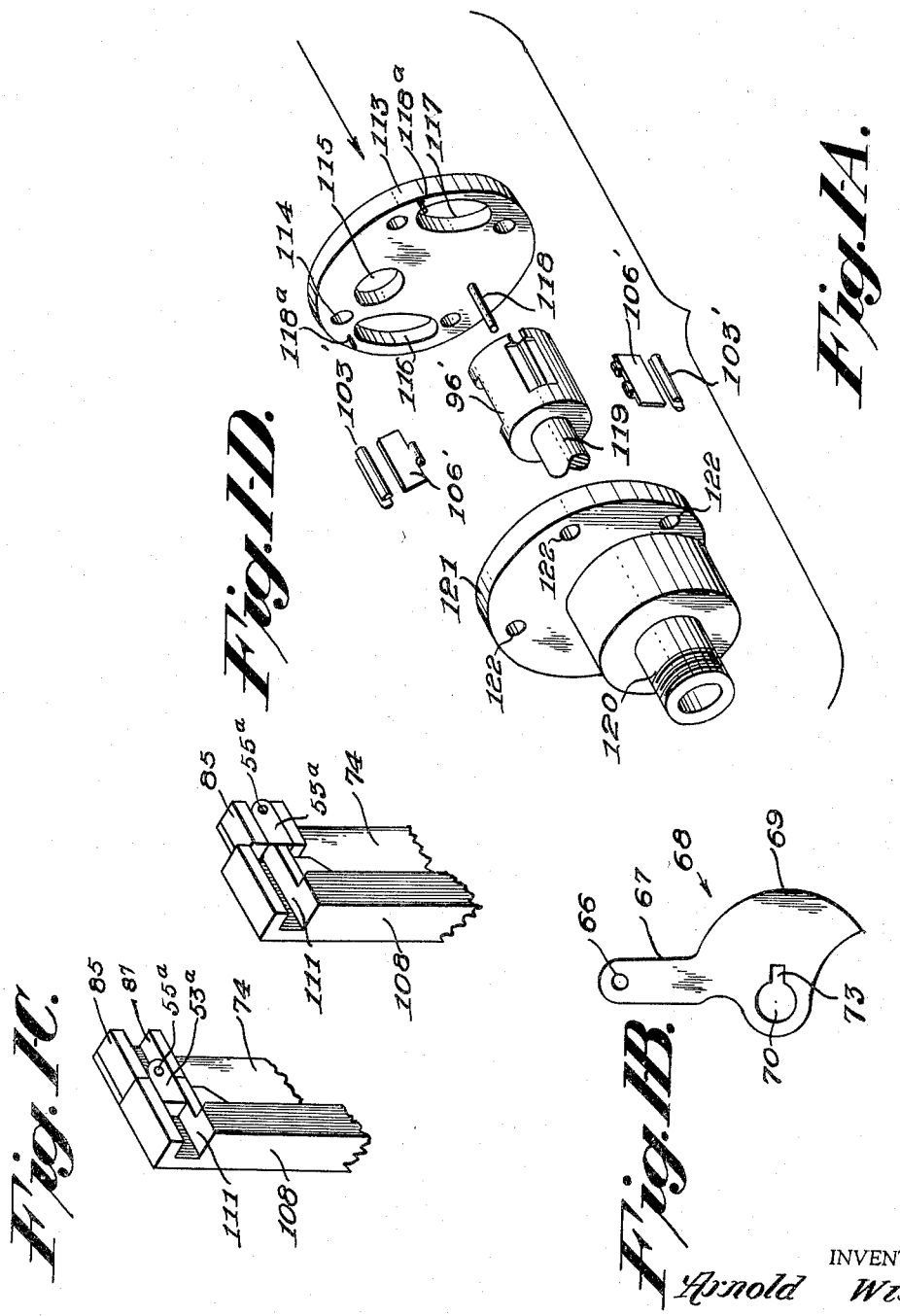

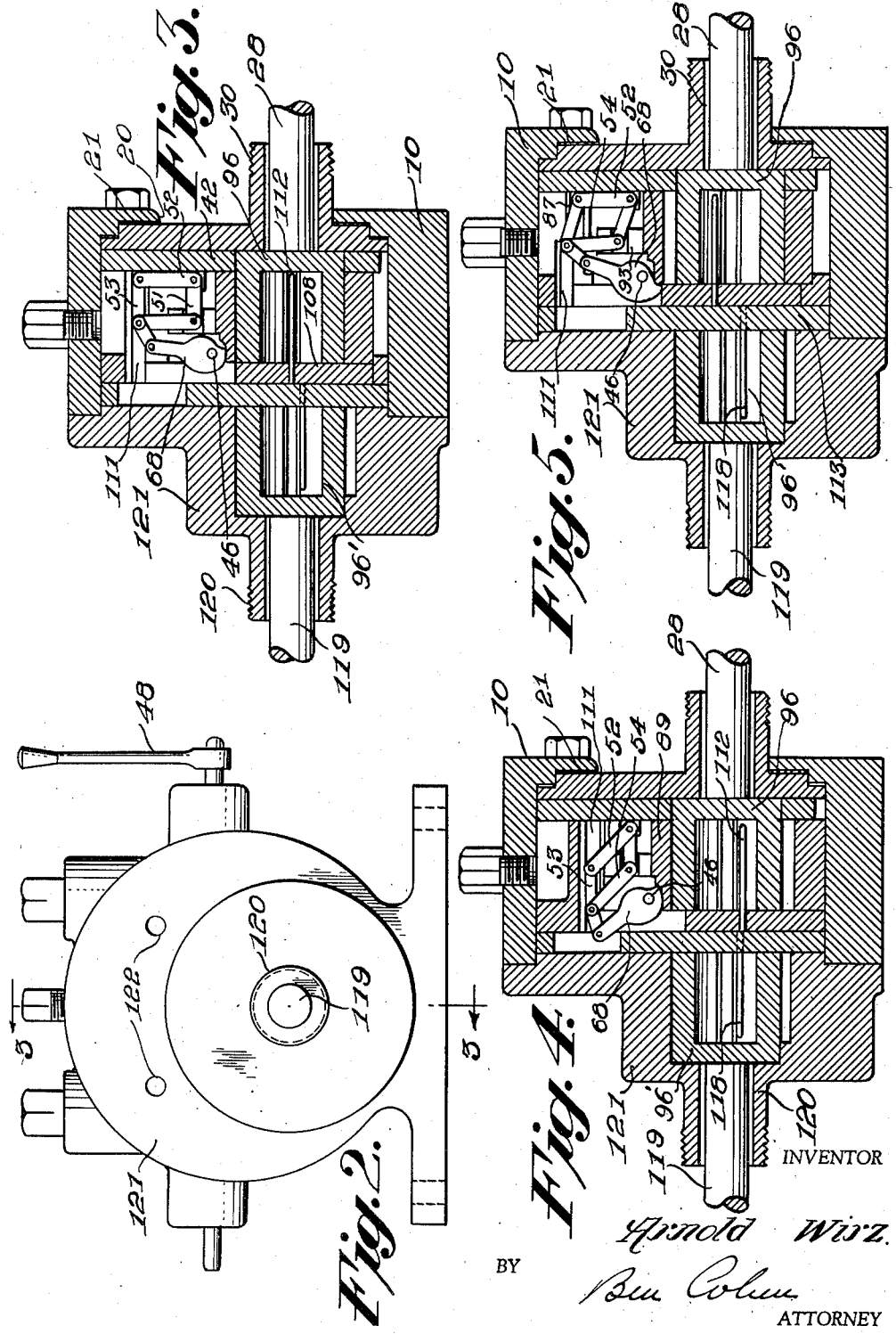

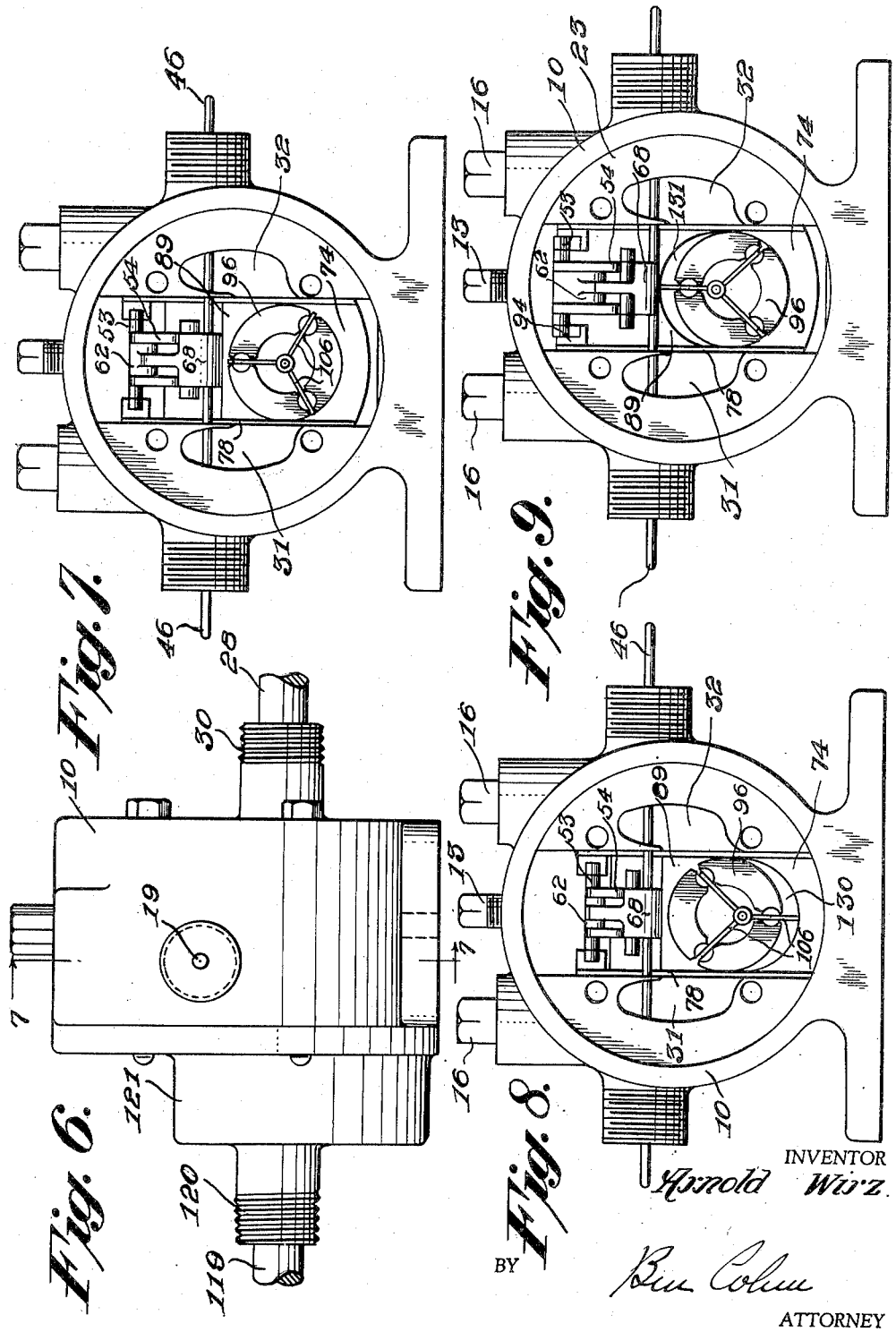

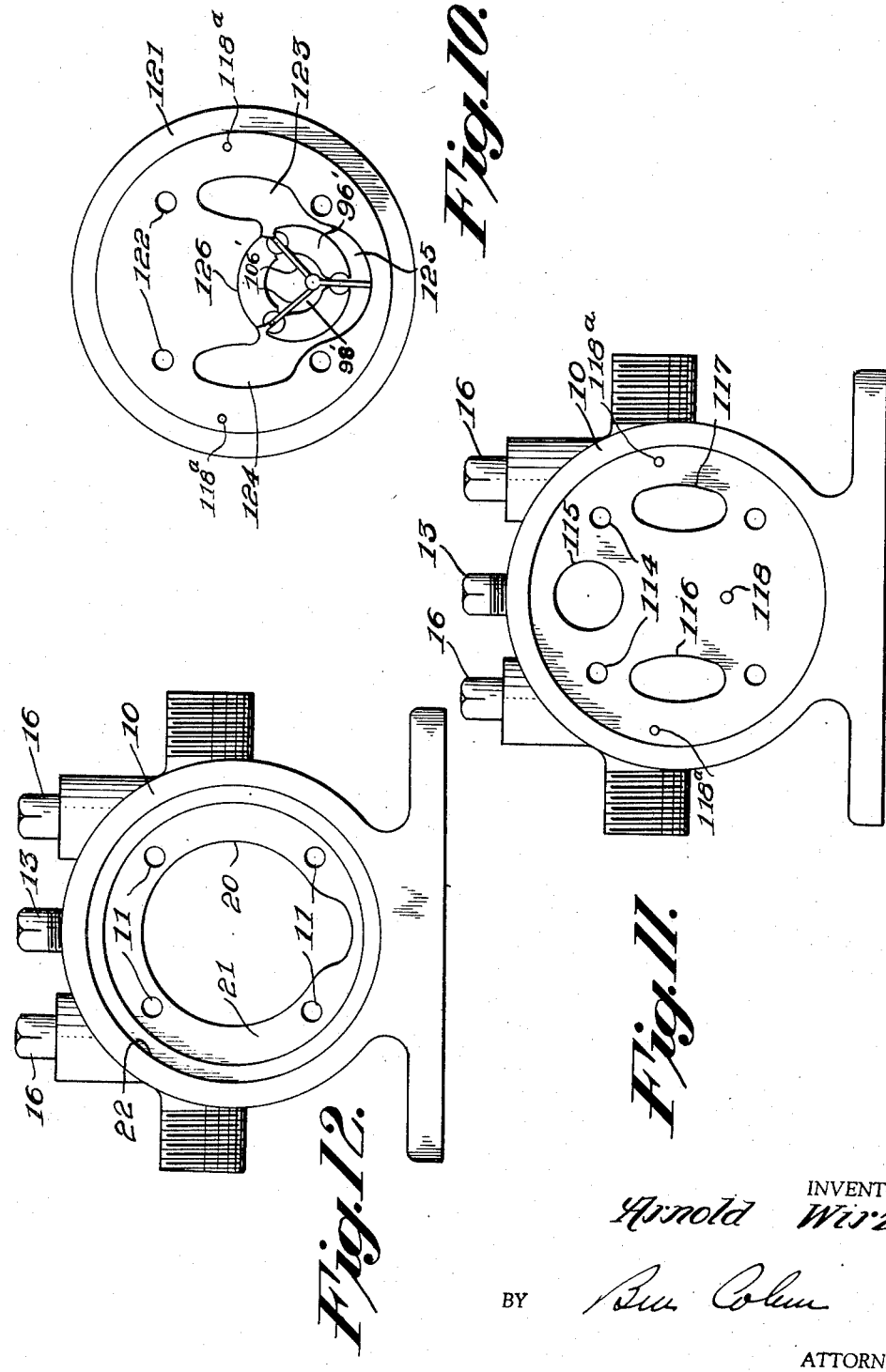

2,804,017

FLUID POWER TRANSMISSION MECHANISM

Arnold Wirz, Buffalo, N. Y.

Application March 5, 1954, Serial No. 414,420

11 Claims. (Cl. 103—3)

This invention relates to fluid power transmission mechanism. The invention is more particularly concerned with a rotary hydraulic pump adapted to be driven from a source of power in one direction and at uniform speed, together with one or more hydraulic motors operatively associated with the pump, and wherein adjusting means are provided for effecting forward or reverse operation of the motor together with variation of the speed thereof in either forward or reverse operation thereof.

A primary object of the invention is to provide structure of the above noted general character which is of relatively simple construction, dependable in operation and which is capable of highly sensitive adjustment for any desired output of power.

A further object of the invention is to provide a single adjustable power driven hydraulic pump together with a plurality of hydraulic motors operatively associated with the pump and jointly operated thereby.

A still further object of the invention is to provide structure as immediately above referred to wherein the motors are capable of being driven at constant or variable speeds from zero to maximum and in either forward or reverse direction without change in speed or direction of the pump.

A still further object of the invention is to provide a rotary fluid pump which is simple in construction, strong, durable, compact and which is capable of operation at high speed.

Other objects and advantages of the invention will become apparent in the course of the following detailed description, taken in connection with the accompanying drawings, wherein:

Figures 1 and 1A are an isometric exploded view of the fluid power transmission mechanism forming the subject matter of the present invention.

Figure 1B is a side elevational view of a cam connecting link entering into the construction.

Figure 1C is a fragmental isometric view showing one position of a slide member.

Figure 1D is a view similar to Figure 1C showing the slide member in another position.

Figure 2 is an elevational view as observed from the motor end of the structure.

Figure 3 is a longitudinal vertical sectional view as observed in the plane of line 3—3 on Figure 2 showing one position of the pump blade control assembly.

Figures 4 and 5 are views similar to Figure 3 but showing certain structural elements in different operative positions.

Figure 6 is a side elevational view of the pump and motor construction.

Figure 7 is a transverse vertical sectional view as observed in the plane of line 7—7 on Figure 6.

Figures 8 and 9 are views similar to Figure 7 but showing certain structural elements in different operative positions.

Figure 10 is a rear elevational view of the motor.

Figure 11 is an end view of the pump housing with the motor housing removed.

Figure 12 is a front end elevational view of the outer pump housing.

The detailed construction of the invention will now be described after which the operation thereof will be described.

The improved structure in accordance with a preferred structural embodiment of the invention comprises an outer pump casing or housing 10 which is provided with a plurality of bolt holes 11 which extend about and parallel with the axis of the housing.

The housing 10 is further provided centrally of the top wall thereof with a threaded passage 12 adapted for connection with a conduit leading to an expansion tank and which passage may be normally closed by a plug 13. The housing 10 is further provided with fluid flow passages 14 and 15 which are normally closed by threaded plugs 16. The housing 10 includes a base 17 which is provided with holes 18 for receiving bolts by which the housing is capable of being rigidly secured to a floor or other horizontal supporting surface. The housing 10 is also provided with a pair of generally diametrically opposed and axially aligned passages 19 for receiving a rotatable control shaft later referred to.

The housing 10 is further provided with a rear opening 20 for the prime mover and a packing ring 21 is disposed within the cylindrical inner wall 22 of the housing adjacent the rear end wall thereof.

An inner pump housing 23 is machined to fit the cylindrical inner wall 22 of the outer housing 10 and same is provided with longitudinally extending bolt holes 24 which are axially aligned with the bolt holes 11 in the outer housing 10. The inner housing is further provided with opposed axially aligned fluid flow apertures 25 (only one of which is shown in Figure 1). The inner housing is further provided with a pair of holes 26 for removable reception of locating pins on a separation plate assembly later referred to. An opening 27 for the shaft 28 to the prime mover is provided in the rear ring wall 29 and which opening extends through an externally threaded shaft packing gland 30 which projects through the opening 20 in the outer housing 10.

The inner housing 23 is provided with diametrically opposed fluid cavities 31 and 32 and also diametrically opposed outer fluid cavities 33 and 34 which are in communication by way of the above mentioned apertures 25. The inner housing is further provided with transversely disposed and axially aligned passages 35 (only one of which appears in Figure 1) for the control shaft later described.

The opposite ends of the inner housing are provided with cylindrical surfaces 36 and 37, which have close fit within the inner cylindrical wall 22 of the outer housing and diametrically opposed raised surfaces 38 and 39 are flush with the said cylindrical surfaces 36 and 37. The inner housing 23 as is clearly indicated in Figure 1 is provided with upper and lower transversely spaced and vertically disposed walls 40 and 41, for a purpose about to appear. Vertically disposed within the inner housing 23 is a rear linkage mounting plate 42 whose rear face engages the rear wall 29 of the inner housing and whose opposite edges engage the vertical surfaces 40, 41 thereof.

The plate 42 is provided with a pair of laterally spaced blocks 43 which are provided with axially aligned apertures 44 for a shaft later referred to, and the plate is provided with a circular opening 45 for a purpose later to appear. A manually operable control shaft 46 is rotatably supported in the aforementioned passages 35 and same is provided with a pair of axially spaced key prong receiving holes 47. The shaft 46 at one end thereof is provided with a removable handle 48 for effecting increment rotation of the shaft.

A shaft 49 has its opposite ends supported in said apertures 44 and the ends also extend through apertures 50 in overlapped end portions of links 51 and 52 of two laterally opposed parallel link arrangements. Each link assembly includes in addition to the links 51 and 52, two corresponding additional links 53 and 54. As indicated more particularly in Figure 1, the links 51 and 53 of each link arrangement are horizontally disposed and so maintained by the other links 52 and 54 and the links of each arrangement have their end portions in overlapping relation and provided with aligned pin receiving apertures.

Links 52 and 53 of each arrangement have their overlapping ends pivotally connected by a pin 55 which extends through aligned apertures 56 in said overlapping ends and which pin is disposed above and in parallel relation to the pin 49. Links 51 and 54 of each arrangement are pivotally connected by a pin 57 which extends through aligned apertures 58 in the overlapping end portions of the said links and which pin is in a horizontal plane of the pin 49. Links 53 and 54 of each arrangement are further pivotally connected by a pin 59 extending through aligned apertures 60 in overlapping end portions thereof and which pin is disposed above pin 57 and in a horizontal plane of the pin 55. A connecting link 61 includes an apertured barrel portion 62 through which loosely extends the pin 59 for pivotal connection of the link with the aforementioned parallelogram link assemblies. The link 61 further includes a pair of parallel spaced arms 63 provided with axially aligned apertures 64 for receiving a pivot pin 65 which also loosely extends through an aperture 66 in the neck 67 of a cam connecting link 68 and which neck is disposed between the link arms 63.

The cam connecting link 68 further includes a relatively long body portion having a cam surface 69 and an aperture 70 for receiving the central portion of the shaft 46 which is provided with a key 71 having prongs 72 receivable in the said holes 47 and which key 71 is receivable in a key way 73 for connecting the cam connecting link 68 to the shaft 46 for rotation therewith.

A lower barrel assembly 74 is provided and which, as is indicated in Figure 1, includes a bottom wall 75 having an upper cylindrical rotor bearing surface 76 and the assembly further includes opposite side walls 77 and 78 comprising lower rectangular portions 79 and 80 and upper reduced extensions 81 and 82. The side walls 77 and 78 have a snug fit between the vertically disposed walls 40 and 41 of the inner pump housing 23 and the rear edges of walls 77 and 78 move freely in a vertical direction upon the rear plate assembly 42. The lower rectangular wall portions 79 and 80 are provided with transversely aligned rectangular fluid flow openings 83 and 84 respectively and the upper ends of the side wall extensions 81 and 82 are provided with transversely aligned blocks 85 and 86 which are provided with channel tracks 87 and 88 respectively.

At this point, it is to be observed that the lower barrel assembly 74 is loosely disposed within the inner pump housing 23 in sliding contact with the vertically disposed walls 40 and 41 thereof.

An upper barrel assembly 89 is floatingly disposed within the lower barrel assembly 74 and same comprises opposite side walls 90 slidably engageable with the inner surfaces of the side walls 77 and 78 of the lower barrel assembly 74, a top wall 91 having a cam surface 91' and a lower cylindrical rotor bearing wall 92. The top wall 91 is provided with laterally opposed blocks 93 which are provided with channel guides 94. The barrel assemblies 74 and 89 provide the pump stator. As indicated in Figures 3, 4 and 5 the cam surface 69 rides upon the cam surface 91'.

A pump rotor assembly 95 comprises the aforementioned shaft 28, and a rotor body 96 which includes a relatively thick cylindrical wall 97 providing a relatively large diameter rotor center opening 98 coaxial with shaft 28. The rotor body wall 97 is provided with three longitudinal and equi-angularly spaced through slots 99 each of which is defined by opposite side walls having opposed bearing surfaces 100 disposed intermediate the inner and outer edges thereof and which are concentric to a line in a plane intermediate the side walls. The side walls further include inner and outer blade rotation limiting surfaces 101 and 102 which are in angular relation to the said plane.

Disposed within each bearing surface 100 are a pair of blade bearing members 103 which includes a convex side 104 and a flat side 105. The convex sides 104 of the bearing members 103 have limited rotation with the bearing surfaces 100 and the flat sides 105 of each pair of bearing members 103 slidably receive a rectangular blade 106 therebetween.

A pump blade control assembly 107 comprises a generally rectangular plate 108 having a lower end 109 corresponding in curvature to the inner wall 22 of the outer pump housing 10, and having a relatively large slot 110 opening through its upper end to afford clearage for the parallelogram link arrangements previously referred to.

The plate 108 at its upper end and at opposite sides of said slot 110 is provided with channel guides 111. The plate 108 is further provided with an inwardly projecting pump blade axis pin 112 on which the three blades 106 are rotatively supported through the instrumentality of staggered barrels 106a on corresponding edges of the blades.

In the assembled position of the above described elements within the inner pump housing 23, the rotor body 96 adjacent the shaft end thereof is snugly received in the circular opening 45 in the plate 42 whereby such plate is restrained against vertical movement. The free end of the rotor body 96 is flush with the outer edges of the lower and upper barrel assemblies and the plate 108 bears against such edges and has its outer face flush with the outer end of the inner pump housing 23. The rear end of the rotor body 96 fits snugly against the rear wall 29 of the inner pump housing 23.

At this point, it is to be observed that the outer housing 10 is closed by an imperforate plate wherein individual motors are utilized but when a motor is provided as a unit with the pump as herein disclosed, a circular plate 113 hereinafter more specifically described is disposed within the outer housing in bearing engagement with the front end of the inner pump housing 23 and whose outer face is flush with the outer end of the outer housing 10. Reverting now to the parallelogram linkage assemblies, it is to be observed that the link pivot pin 55 has its opposite ends projecting outwardly from the links 53 and which ends extend loosely into apertures 55a in corresponding ends of slide members 53a which are of elongated form and rectangular in cross section.

The slide members 53a are slidably disposed within the guide channels 87 in the lower barrel assembly 74 as well as within the guide channels 111 in the pump blade control plate 108 in one position of the linkage assemblies. The pivot pin 57 has its opposite ends extended beyond the links 51 and such ends are provided with roller bearings 57a which are operatively disposed within the channel guides 94 of the upper barrel assembly 89 and the pivot pin 59 is likewise provided with roller bearings 59a which are operatively disposed within the channel guides 111 on the pump blade control plate 108.

The above referred to plate 113 constitutes a division between the pump and the motor about to be described and accordingly may be referred to as a "separation plate." The plate 113 is provided with bolt receiving holes 114 in axial alignment with the bolt holes 11 in the pump outer housing 10 as well as the bolt holes 24 in the inner pump housing 23.

The plate is further provided with a relatively large circular aperture 115 to allow proper action of the cam connecting link 68 and the plate is further provided with a pair of laterally disposed fluid flow openings 116 and 117 and projecting from the outer face of the plate adjacent its lowermost edge is a motor blade axis pin 118.

The pin projects into a center opening 98' in a cylindrical motor rotor body member 96' which together with the bearings and blades is identical in construction to the aforementioned pump rotor assembly and accordingly the several elements in the motor assembly corresponding to those in the pump assembly are identified on the drawings by the same reference numerals with a prime suffix. The plate 113 is further provided with centering pins 118a which are received in corresponding apertures in motor housing 121.

The rotor body 96' is provided with an output power shaft 119 which is rotatively supported in a packing gland 120 integral with and projecting from a motor housing 121 which is provided with threaded bolt receiving apertures 122 into which the ends of bolts extending through the aligned apertures 11, 24 and 114 are secured whereby the outer pump housing 10, rotor housing 121 and parts therewithin are maintained in operative relationship.

The motor housing 121 is provided with laterally opposed fluid flow cavities 123 and 124 and a lower fluid flow cavity 125 having restricted communication with the cavities 123 and 124 by intervention of the rotor body 96' whose cylindrical wall engages a corresponding arcuate surface 126 on the housing intermediate the cavities 123 and 124.

The operation of the construction as disclosed is as follows:

Starting with the pump rotor 96 rotating in a clockwise direction and with the control shaft 46 together with the cam link 68 rotated to the position indicated in Figures 4 and 8 both the lower and upper barrel assemblies 74 and 89 are in their lowermost positions with the slide members 53a disposed in the channel tracks 87 and 111 as seen in Figure 1C, with the result that the blade control plate 108 is also in its lowermost position. With this position of parts a fluid space 130 will be provided between the opposed cylindrical surfaces of the lower barrel assembly 74 and the pump rotor body 96 and due to the blade axis pin 112 having been lowered to a position below the axis of the rotor body, the blades 106 will successively traverse the fluid filled space 130.

The fluid being impelled by the successive blades 106 will flow as follows, from the space 130 through the fluid flow opening 83, into cavity 31, through fluid flow opening 116 into fluid flow cavity 123, into lower cavity 125, into fluid flow cavity 124, through fluid flow opening 117, onto inner cavity 32, through fluid flow opening 84 and back to space 130, wherein the blades 106 cause the fluid to continue moving. It is to be observed that in the above described flow of the fluid, the motor rotor body 96' will rotate clockwise, the rotation of this rotor body being effected by fluid pressure on the blades 106.

For counter-clockwise rotating of the motor rotor body 96', the control shaft 46 will be rotated with a resulting position of parts as shown in Figures 5 and 9 wherein the lower and upper barrel assemblies 74 and 89 will be moved to their uppermost positions and wherein the pivot pin 59 together with the roller bearings 59a operating in channel track 111 will have moved control plate 108 to its uppermost position, with a resulting fluid space 131 between the pump rotor 96 and the upper barrel assembly 89 and the blade axis pin 112 will have moved to a position above the axis of said rotor whereby the blades 106 will traverse the space 131 upon rotation thereof in the same direction as when traversing the space 130 above referred to.

In this position of parts, the flow of fluid will be as follows, from space 131, through fluid flow opening 84, into cavity 32, through fluid flow opening 117, into fluid cavity 124 into lower cavity 125 into fluid flow cavity 123, through fluid flow opening 116, into inner cavity 31, through fluid flow opening 83 and back to space 131 wherein the blades 106 cause the fluid to continue moving.

It is to be observed that with this adjustment fluid flows through the lower cavity 125 in a direction opposite to the first described disposition of parts with a resulting reverse rotation of the motor rotor 96'.

When the control shaft 46 is rotated to the position of Figures 3 and 7 the lower and upper barrel assemblies 74 and 89 are in contact with the pump rotor 96 and control plate 108 has been moved to a position wherein the blade axis pin 112 is in the axis of the rotor body 96 with a resulting lack of fluid space about the rotor and a withdrawal of the fluid impelling blades 106 to ineffective positions within the circumference of the pump rotor body 96.

Accordingly, with the above position of parts there will be no fluid flow through the motor housing and no movement will be imparted to the motor shaft 119.

While in the immediately above description the pump has been described in three different specific positions, it is to be understood that intermediate positions are readily available through rotation of the control handle 46. For example, a maximum fluid space 130 and 131 is disclosed in the clockwise and anti-clockwise rotation adjustments in Figures 4 and 8 and Figures 5 and 9 respectively. However, it is obvious that these spaces can be varied in volume and as a consequence of which the speed of rotation of the motor rotor shaft 119 can be varied from zero to a maximum in either forward or reverse rotation thereof with a maintenance of constant speed of rotation of the power driven shaft 28 for the pump rotor 96. From the above, it should be readily appreciated that the novel pump structure whose rotor is power driven at constant speed of rotation, is capable through the disclosed novel control mechanism of driving the motor rotor at variable speeds in either forward or reverse rotation thereof. While the motor is herein disclosed as being unitary with the pump, the pump is readily applicable for simultaneously driving a multiplicity of motors arranged in parallel or in series.

When the novel pump structure is to be used as a common adjustable drive for a multiplicity of motors the separation plate 113 will be replaced by an imperforate closure member for the corresponding end of the pump housing 10. In such installation as above referred to, the plugs 16 will be removed and fluid conduits connected with the fluid flow passages 14 and 15 and which conduits will lead to the cavities 123 and 124 in the motor housings corresponding to the housing 121, herein disclosed. With this arrangement the fluid flow in the clockwise rotation of the pump rotor 96 will be as follows, from the space 130, into cavity 31, through the adjacent aperture 25, into fluid flow cavity 33, through passage 14 and connected conduit and thence to the motor or motors, from the motor and other conduit through passage 15, into cavity 34, through the other aperture 25 into cavity 32 and through opening 84 and back to space 130. In the adjusted position of the pump according to Figures 5 and 9, the above direction of fluid flow will of course be reversed While I have disclosed my invention in accordance with a single specific structure embodiment thereof, such is to be considered as illustrative only, and not restrictive, the scope of the invention being defined in the following claims.

Having thus described the invention, what is claimed is:
1. A rotary fluid pump comprising a housing, a generally cylindrical rotor body supported in the housing for uniform unidirectional rotation, a plurality of propeller blades mounted in said rotor body for radial movement between extended position and position within the outer wall of the rotor body, a stator comprising upper and lower barrel members having opposed concave surfaces conforming to the cylindrical surface of the rotor body, said barrel members being supported within the housing for limited vertical movement toward and from the rotor body, manually controllable means operatively connected to said blades and said barrel members for selectively moving the barrel members and blades to positions with fluid spaces below or above said rotor body with the blades traversing same or with the barrel members in contact with said rotor body and the blades retracted within the rotor body.

2. A rotary fluid pump according to claim 1, wherein said rotor body is provided with a central longitudinally extending opening and angularly disposed slots extending from the outer wall of the rotor body to said opening, a central plate supported within the housing for limited vertical movement, said blades being rotatably supported by a pin projecting from said central plate with the pin disposed within said opening and the blades disposed within said slots, and said manually controllable means comprising channel tracks on said barrel members and said central plate together with a parallelogram linkage unit having sliding contact with said tracks.

3. The structure according to claim 2, together with an inner pump housing disposed within said first housing and having a rear wall, opposed vertically spaced longitudinal walls and fluid cavities between said longitudinal walls, a linkage mounting plate supported within said inner housing in contact with said rear wall, said barrel members being of boxlike form with the upper one slidably mounted in the lower one whose rear edge slidably engages said linkage mounting plate, said linkage mounting plate being provided with a circular opening providing bearing for one end of the rotor body, and said control plate contacting the opposite end of said rotor body and closing the opening therein, and said vertically spaced longitudinal walls confining said barrel members and control plate to vertical movement in longitudinal planes of said first housing.

4. The structure according to claim 3, wherein said mounting plate is provided with a pair of laterally spaced blocks provided with transversely aligned apertures, said parallelogram linkage unit comprising a pin having opposite ends thereof disposed within said apertures, a generally vertical link having its lower end pivotally connected by said pin adjacent each end thereof, a second generally vertical link parallel with each of said first links and disposed in longitudinally spaced relation thereto, upper and lower horizontal link having their opposite ends pivotally connected to the opposite ends of said first links, slide members movable in the tracks on said lower barrel members and said control plate and being pivotally connected to the upper ends of said first links, said second generally vertical links having roller bearings rotatably supported by the upper and lower ends thereof, the upper bearings being disposed in the tracks on said control plate and the lower bearings being disposed in the tracks on said upper barrel member.

5. The structure according to claim 4 wherein the pivotal connection between the upper ends of said second generally vertical links and the corresponding horizontal links is provided by a pin projecting through aligned apertures in the links and manually controllable adjusting means connected with said pin for effecting lateral movement thereof with corresponding movement of said links and said slide members and roller bearings in their respective tracks.

6. The structure according to claim 5, wherein said means comprises a link pivotally connected to said pin, a cam link pivotally connected to said first link, and a cam engaging surface on said upper barrel member.

7. The structure according to claim 6, together with a control shaft extending transversely of said inner and outer housings and rotatably journalled therein, said shaft extending through and being keyed to said cam link, and a handle on one end of said shaft.

8. A rotary pump comprising an outer housing, an inner housing removably disposed within said outer housing and provided with a rotor shaft packing gland extending through an opening in the outer housing, said inner housing being provided with a vertical transverse rear wall and laterally opposed upper and lower parallel vertical walls, opposed fluid cavities in the inner housing between said upper and lower vertical walls, opposed fluid cavities in the inner housing externally of said first cavities, apertures interconnecting said first and second fluid cavities, a linkage mounting plate disposed within said inner housing between said upper and lower vertical walls and in contact with said rear wall, said mounting plate being provided with a circular opening, a lower barrel member supported between said upper and lower vertical walls in vertical sliding contact therewith and with said mounting plate, an upper barrel member vertically slidably disposed within said lower barrel member, said barrel members being provided with opposing cylindrical walls, a cylindrical rotor body disposed within said lower and upper barrel members and having a shaft extending through said packing gland, said rotor body being journalled in said circular opening in said mounting plate and being provided with a central opening and radial slots extending outwardly therefrom, a control plate disposed in said inner housing between said upper and lower vertical walls and being provided with a pin projecting into said rotor body opening, a plurality of rotor blades rotatably supported on said pin and projecting through said slots in said rotor body, laterally opposed tracks on the upper ends of each of said lower and upper barrel members and said control plate, and manually controllable means operatively engaged with said tracks for selectively vertically adjusting said barrel members and said control plate for provision of a fluid space below or above said rotor body with corresponding eccentricity of the said blade mounting pin for traversal of the blades of either space.

9. The structure according to claim 8 wherein said lower barrel member is provided with fluid flow openings in communication with said first fluid cavities.

10. The structure according to claim 8 together with a circular closure plate removably disposed within said first housing in engagement with said control plate.

11. The structure according to claim 10 together with fluid flow passages in said first housing in communication with said second fluid cavities.

References Cited in the file of this patent

UNITED STATES PATENTS

| | | |
|---|---|---|
| 2,016,315 | Calzoni | Oct. 8, 1935 |
| 2,049,092 | Sturm | July 28, 1936 |
| 2,458,023 | Pike | Jan. 4, 1949 |
| 2,535,267 | Cline | Dec. 26, 1950 |
| 2,538,193 | Ferris | Jan. 16, 1951 |
| 2,631,544 | Wilcox | Mar. 17, 1953 |

FOREIGN PATENTS

| | | |
|---|---|---|
| 221,749 | Great Britain | Sept. 18, 1924 |